Feb. 5, 1957 — ÅKE WAHLBERG — 2,780,079
COUPLINGS
Filed April 8, 1952
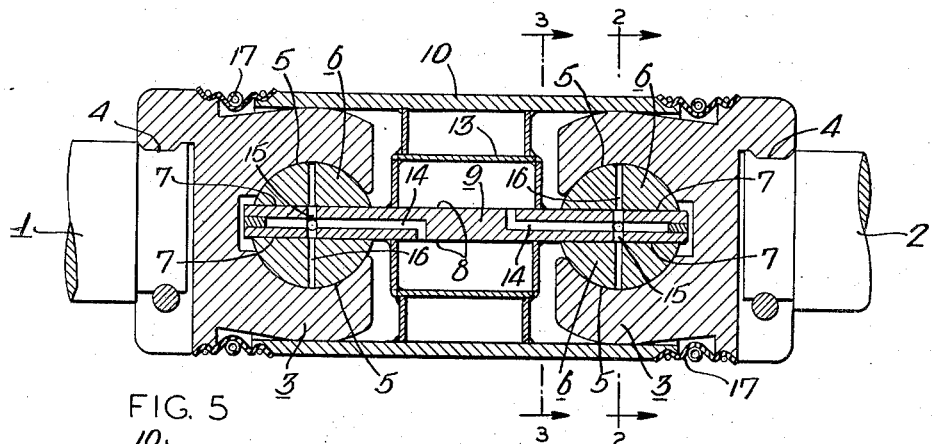
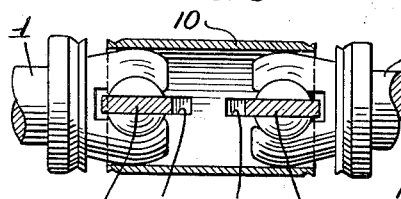
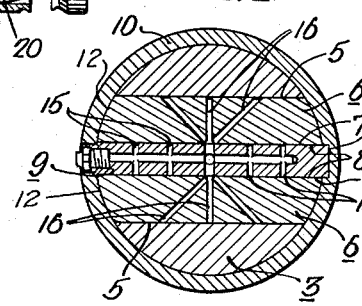
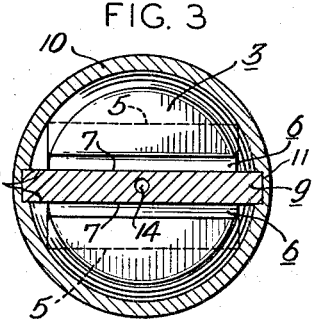
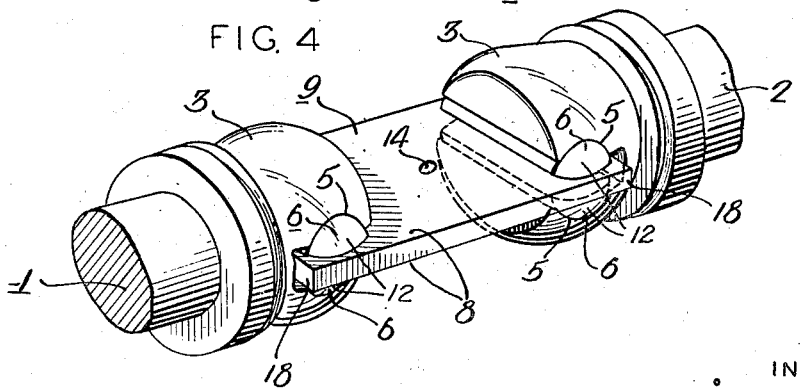
INVENTOR
ÅKE WAHLBERG
BY HIS ATTORNEYS
Howson & Howson

United States Patent Office 2,780,079
Patented Feb. 5, 1957

2,780,079

COUPLINGS

Åke Wahlberg, Degerfors, Sweden, assignor, by mesne assignments, to SKF Industries, Inc., Philadelphia, Pa., a corporation of Delaware Application April 8, 1952, Serial No. 281,097

Claims priority, application Sweden June 18, 1946

6 Claims. (Cl. 64—7)

The rolls of a train of rolling mills are usually connected by means of coupling boxes, which often consist of a pair of universal joints interconnected through a suitable torque-transmitting connector member. The connector is often wholly or partially flat and its flat ends are inserted into the universal joints so that the flat surfaces engage with corresponding surfaces on pintle members in the universal joint. In coupling boxes as hitherto made for carrying out the same functions as the coupling according to the present invention the torque is transmitted solely through the connector member which therefor must be made comparatively thick in order to enable it to withstand the stresses to which it is subjected. The flat surfaces of the pintle members engaging the connector must consequently be located comparatively far from the centerline of the connector.

The mean specific pressure ($p$) between the surfaces of the pintle members and the connector can (if the system is rigid) be expressed mathematically by the equation:

$$p = \frac{K_1}{K_2 - x^2}$$

in which $K_1$ and $K_2$ are constants and "$x$" is the distance of the engaging surface from the centerline. It follows from the equation that the specific pressure on the surface lessens rapidly if the flat ends of the connector are made thinner so that the distance "$x$" is lessened.

The present invention has for its purpose to make it possible to decrease the thickness of the ends of the connector or equivalent members and thereby lessen the pressure between the engaging surfaces of the said ends and pintle members so that the wear on these surfaces is not as rapid as in the usual type of coupling. This may be accomplished in a preferred embodiment of the invention by connecting the connector member with a sleeve or the like which surrounds the said member and carries the torque to be transmited by the coupling.

The invention is illustrated in the accompanying drawing in which Fig. 1 is a sectional view along the axis of the coupling; Fig. 2 is a cross sectional view on the line 2—2 of Fig. 1; Fig. 3 is a cross sectional view on the line 3—3 of Fig. 1; Fig. 4 is a fragmentary view in perspective of the coupling excluding the torque-transmission sleeve and the elements of the oil retainer; and Fig. 5 is an axial cross sectional view of a coupling illustrating a modification within the scope of the invention.

In the form of the invention illustrated in Figs. 1 to 4 inclusive, the numerals 1 and 2 designate the ends of two rolls to be connected. A head 3 is fixed on the end of each roll neck 4. The heads are provided with transversely extending cylindrical bores 5 in which are mounted semicylindrical pintle members 6 fitting the bores. The members 6 have flat surfaces 7 for engaging corresponding sliding surfaces 8 on a flat connector member 9 of suitable material, e. g. hardened steel. The skewing and axial displacements which the coupling is to accommodate are made possible by relative sliding between the cylindrical surfaces of the heads and the members 6 and between the flat surfaces 7 of the latter members and the connector member as hereinafter more fully described.

A sleeve-shaped member 10 surrounds the coupling heads and is connected in a suitable manner to the connector members 9 along the sides of the latter, e. g. by providing the inner surface of the sleeve with an axially extending groove, as shown at 11 in Fig. 2, in which the edge of the said connector member is inserted. Consequently, the torque is transmitted by the sleeve, and the connector member 9 need only be sufficiently thick to withstand the shearing forces to which it is subjected at its junction with the sleeve. Since the thickness can thus be made less it follows that the pressure on the surfaces will be less, as explained above.

It will be noted by reference to Figures 2, 3 and 4 that the surfaces of the heads 3 which engage the inner surface of the sleeve 10 are of spherical contour, as required for universal movement of the head within the sleeve as specified. To this end also the ends 12 of the members 6 are spherical, as shown in Figures 3 and 4, and form in effect continuations of the spherical surfaces of the heads. The heads therefor may turn freely in the sleeve about the axes of the cylinders defined by the respective sets of semi-cylindrical pintle members 6, and may turn equally freely about axes normal to the axes of the said pintle members and to the flat faces 8 of the connector member 9 which engage said pintle members and intersecting the centers of the spheres defined by the outer surfaces of the heads. In this latter movement the flat surfaces 7 of the semi-cylindrical members 6 slide on the said confronting faces of the connector member 9.

Thus each of the heads is capable of individual universal movement with respect to the axis of the coupling, which axis corresponds to the center line of the sleeve 10; and each of the heads with its pintle means and the member 9 constitutes a universal joint located respectively in the opposite ends of the said sleeve.

The connector member 9 may be suitably provided with an oil retainer 13 from which lubricant is supplied to the sliding surfaces through channels 14, 15, and 16. By connecting the sleeve 10 and the heads 3 by means of sealing members 17 of some suitable flexible material such as rubber, fabric, etc. a closed chamber is formed which can be filled with lubricant so that all surfaces between which relative movement takes place are immersed in an oil bath.

Since all axial movements take place between the above mentioned flat surfaces, the heads 3 can be fastened on the roll necks 4 in a very simple manner.

The form of the coupling may be varied without departing from the spirit of the invention. It will be apparent, for example, that the ends 18, 18 of the connector member 9 constitute in effect functionally individual elements through which the two universal joints are connected respectively to the opposite ends of the sleeve 10, whereby the sleeve is made to constitute the primary means for transmission of torque between the joints. The end portions 18, 18 need not be connected therefore and may take the form of separate elements as indicated at 19 and 20 in Figure 5, constituting functional parts of the respective joints. In this case relative movements between the heads of the two joints along the axis of the coupling may be accommodated entirely by sliding of the elements 19 and 20 in the longitudinal slots 21 and 22 in the sleeve 10.

I claim:

1. In a rotary coupling a pair of universal joints disposed in spaced, substantially axial alinement and each comprising a rotary head member, pintle means mounted on the said head member for movement with respect to the latter about an axis normal to the rotary axis of the head member, and a flat, plate-like member slidably fitted to the pintle means for angular movement relative to the latter in a plane containing the rotary axes of the pintle means and of the head member; and an integral sleeve-like member extending between and embracing said spaced, substantially alined head members and having on its inner surface an axially-extending groove into which an edge of said plate-like member is seated, engagement of said edge within said groove constituting a driving connection between said head member and said pintle means and said sleeve-like member, whereby transmittal of torque from one head member to the other is effected primarily through said sleeve-like member.

2. A coupling as defined in claim 1, wherein said flat, plate-like member is located on the axial center line between the two head members and the edge connection between said flat, plate-like member and said groove on the inner surface of said sleeve-like member is at a location radially remote from said axial center line.

3. A coupling according to claim 1 wherein the said plate-like member comprises a lubricant chamber and channels extending to the contacting surfaces of the said plate-like member and the pintle means.

4. A coupling according to claim 3 wherein the pintle means contains channels communicating with the channels in said plate-like member and extending to the contacting surfaces of the pintle means and head members.

5. In a rotary coupling a pair of universal joints disposed in spaced, substantially axial alinement and each comprising a rotary head member, pintle means mounted on the said head member for movement with respect to the latter about an axis normal to the rotary axis of the head member and an element located on the axial center line of the head member and fitted to the pintle means for angular movement relative to the latter in a plane containing the rotary axes of the pintle means and of the head member, and a sleeve-like member extending between and embracing said spaced, substantially axially alined head members and having a driving connection with the said element at a location radially remote from said center line for mutual rotation of said sleeve-like member with the head members about the said center line, said sleeve-like member constituting the primary torque transmitting member for transmission of torque between the head members.

6. In a rotary coupling a pair of universal joints disposed in spaced, substantially axial alinement and each comprising a rotary head member, pintle means mounted on the said head member for movement with respect to the latter about an axis normal to the rotary axis of the head member, and a flat plate-like member slidably fitted to the pintle means for angular movement relative to the latter in a plane containing the rotary axes of the pintle means and of the head member, a sleeve-like member extending between and embracing said spaced, substantially axially alined head members and having a pair of diametrically opposed, axially extending slotted sockets on its inner surface receiving the side edges of said flat, plate-like member, engagement of said side edges of said plate-like member within said diametrically opposed, axially extending slotted sockets constituting a driving connection between said head member and said pintle means and said sleeve-like member whereby transmittal of torque from one head member to the other is effected primarily through said sleeve-like member.

References Cited in the file of this patent

UNITED STATES PATENTS 1,907,833   Kurtze _____ May 9, 1933